Patented Mar. 17, 1931

1,796,980

UNITED STATES PATENT OFFICE

WILLIAM S. CALCOTT AND WILLIAM A. DOUGLASS, OF PENNS GROVE, NEW JERSEY, ASSIGNORS TO E. I. DU PONT DE NEMOURS & COMPANY, OF WILMINGTON, DELAWARE, A CORPORATION OF DELAWARE

RUBBER ANTIOXIDANT

No Drawing.    Application filed August 8, 1929.   Serial No. 384,473.

This invention is concerned with new materials adapted for use as preservatives or antioxidants for rubber and obtained by the reaction of aromatic amines on certain sugars, such as the poly-hydric aldehydes. It is also concerned with the rubber products resulting from the use of the new compounds.

A number of different classes of compounds have heretofore been proposed for use with rubber to prevent deterioration, particularly in the presence of oxygen, and many of these have been found to have considerable merit.

We have now discovered however a new class of products unknown prior to our invention and which have certain specific effects when used in combination with rubber and similar materials. This new class of products comprises a large number of reaction products which may advantageously be employed either as accelerators of vulcanization or as deterioration inhibitors.

These products are of indefinite constitution and may be prepared either by heating together equal parts of a sugar and an amine or by bringing these reagents together in the presence of a solvent.

In order to better disclose the method of their preparation and their efficiency as antioxidants, the following examples of actual embodiments are furnished. It is to be understood that these examples are furnished merely by way of illustration, however, and that it is not our intention to be limited to the particular conditions or reagents specified except as indicated in the appended claims.

Example 1

50 parts of glucose were heated with 50 parts of meta-toluylene-diamine and 30 parts of water, with constant stirring. The temperature rose gradually until it reached 116° C. when the mass was poured into a mold where, on cooling, it solidified to a transparent brittle mass. This product dispersed well in rubber, as shown by examination of a thin section under a magnification of 440 diameters. The dispersion is very much better than ordinarily obtained with meta-toluylene-diamine alone.

In order to test the antioxidant properties of the new compound, a rubber stock was then made up with 100 parts smoked sheets, 18.5 ZnO, 0.5625 diorthotolylguanidine, 2.75 sulfur, 2.5 of the dextrose M. T. D. reaction products. A second stock was made up by the same formula, except that it contained no dextrose M. T. D.

The two were then cured for 45 minutes at 40 lbs. steam, and the vulcanized rubber was tested for complete deterioration in the oxygen bomb at 70° C. under 300 lb. oxygen pressure. The stock containing no antioxidant completely deteriorated in 5 days as against 12 days for the stock containing the dextrose M. T. D. mixture.

Example 2

Equal parts of meta-toluylene-diamine, glucose and phenyl-a-naphthylamine were heated with water until the temperature was approximately 115° C., after which the mixture was poured into a mold and cooled. The resulting product was found to have antioxidant properties comparable to those of the product of Example 1 when used in rubber.

In place of the glucose employed in the examples we have found it possible to employ cane sugar, although in this case the reaction with the amine is much slower. It is also possible to use poly-hydric-aldehydes such as, for example, arabinose, or the disaccharides, lactose and maltose. Also, obviously many other aromatic amines than those disclosed in the examples may be employed. Amines which are suitable include, for example, aniline, toluidine, xylidine, naphthylamine, etc., and such amines as the anisidines and phenetidines.

It will be evident from the above that a large number of compounds come within the scope of the invention which broadly contemplates the reaction products of sugars and aromatic amines. Of these compounds, however, those obtained by the reaction between glucose and the aromatic diamines, particularly those of the type of meta-toluylenediamine, are preferred.

The antioxidants may be incorporated into the rubber by any well known means, such as milling them into the stock upon the rolls of an ordinary mill or by adding them to the latex either in powdered form or in a dissolved state. Moreover, they may be employed with various rubber compounding ingredients and it is therefore to be understood that the invention is not to be limited to any particular rubber compound. Also, the proportions of antioxidant employed may be varied within wide limits depending somewhat upon the particular antioxidant employed. Under ordinary circumstances from .5 to 2.5% of the antioxidant, based on the weight of the stock treated, has been found to be highly satisfactory.

While we prefer to use antioxidants of this type by adding the antioxidant to the rubber mix prior to vulcanization, it is also possible to use them for treatment of vulcanized rubber where the antioxidant is either dissolved in a solvent or in vapor form. These materials are also effective in the preservation of certain other rubber-like materials, such as gutta-percha, balata, and synthetic rubber.

When the antioxidants are milled into the rubber it is important that an accelerator also be incorporated prior to vulcanization. By this means the maximum anti-aging effects are secured.

Although the products of the invention in general are dispersed very easily in rubber, and this is one of their chief advantages, dispersing agents such as soap, paraffin, or stearic acid, may be mixed therewith as desired.

As many apparent and widely different embodiments of this invention may be made without departing from the spirit thereof, it is to be understood that we do not limit ourselves to the foregoing examples or description except as indicated in the following claims.

We claim:

1. As a new product, the compound obtained by the reaction of glucose on a primary aromatic diamine.

2. A transparent brittle solid obtained by the reaction of glucose on meta-toluylene diamine, said product being adapted to retard the deterioration of rubber.

3. Rubber containing the product of claim 1.

4. Rubber containing the product of claim 2.

5. Vulcanized rubber obtained by incorporating with the rubber prior to vulcanization a vulcanizing agent, an accelerator, and an antioxidant of the type set forth in claim 1 and thereafter vulcanizing.

6. Vulcanized rubber obtained by incorporating with the rubber prior to vulcanization a vulcanizing agent, an accelerator, and an antioxidant of the type set forth in claim 2 and thereafter vulcanizing.

In testimony whereof we affix our signatures.

WILLIAM S. CALCOTT.
WILLIAM A. DOUGLASS.